(12) United States Patent
Gur et al.

(10) Patent No.: US 11,614,825 B2
(45) Date of Patent: Mar. 28, 2023

(54) TOUCH STATUS INDICATION FOR ACTIVE STYLUS

(71) Applicant: Microsoft Technology Licensing, LLC, Redmond, WA (US)

(72) Inventors: Arie Yehuda Gur, Kiryat Ono (IL); Amir Zyskind, Tel Aviv (IL); On Haran, Kfar Saba (IL); Nadav Linenberg, Even Yehuda (IL); Eran Chencinski, Giv'at Shmuel (IL); Roy Gan Maiberger, Kiryat-Ono (IL); Uri Ron, Kfar Saba (IL); Vadim Mishalov, Tel-Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/235,731

(22) Filed: Apr. 20, 2021

(65) Prior Publication Data

US 2022/0334698 A1    Oct. 20, 2022

(51) Int. Cl.
*G06F 3/041* (2006.01)
*G06F 3/044* (2006.01)
*G06F 3/01* (2006.01)
*G06F 3/0354* (2013.01)
*G06F 3/038* (2013.01)

(52) U.S. Cl.
CPC .......... *G06F 3/04162* (2019.05); *G06F 3/016* (2013.01); *G06F 3/038* (2013.01); *G06F 3/03545* (2013.01); *G06F 3/0441* (2019.05); *G06F 3/0442* (2019.05); *G06F 2203/04108* (2013.01)

(58) Field of Classification Search
CPC ... G06F 3/04162; G06F 3/0441; G06F 3/0442
See application file for complete search history.

(56) References Cited

U.S. PATENT DOCUMENTS

| 8,629,358 | B2 | 1/2014 | Rimon et al. |
| 10,254,857 | B2 | 4/2019 | Winebrand et al. |
| 10,444,866 | B2 | 10/2019 | Keam et al. |
| 10,691,209 | B2 | 6/2020 | Huizar et al. |

(Continued)

OTHER PUBLICATIONS

Cho et al., "RealPen: Providing Realism in Handwriting Tasks on Touch Surfaces using Auditory-Tactile Feedback", In Journal of Computing Research Repository, Mar. 6, 2018, pp. 1-11.

(Continued)

*Primary Examiner* — Chun-Nan Lin
(74) *Attorney, Agent, or Firm* — Alleman Hall Creasman & Tuttle LLP

(57) ABSTRACT

An active stylus includes a stylus tip and a pressure sensor disposed proximate to the stylus tip. A stylus controller is configured to receive, from the pressure sensor, a current pressure value quantifying a pressure measured at the stylus tip. The stylus controller receives, from a separate display device, a proximity indicator that indicates a current estimated proximity of the stylus tip to a surface of a touch-sensitive display of the display device. Based at least on both of (1) the proximity indicator received from the separate display device, and (2) a comparison between the current pressure value and a touch input pressure threshold, the stylus controller sends a touch status indicator to the separate display device.

20 Claims, 4 Drawing Sheets

(56) References Cited

U.S. PATENT DOCUMENTS

| | | |
|---|---|---|
| 10,732,695 B2 | 8/2020 | Zyskind et al. |
| 2011/0148824 A1 | 6/2011 | Haverty |
| 2014/0165742 A1* | 6/2014 | Fergusson ............... G01L 1/144 |
| | | 73/862.68 |
| 2017/0255282 A1* | 9/2017 | Winebrand ......... G06F 3/04162 |
| 2017/0255328 A1* | 9/2017 | Zyskind ................ G06F 3/0383 |
| 2017/0300138 A1* | 10/2017 | Qian ..................... G06F 3/0446 |
| 2018/0136747 A1* | 5/2018 | Keam .................. G06F 3/03545 |
| 2019/0384402 A1* | 12/2019 | Huizar .................... G06F 3/016 |
| 2020/0293173 A1 | 9/2020 | Perez et al. |
| 2020/0401241 A1 | 12/2020 | Barel et al. |

OTHER PUBLICATIONS

"International Search Report & Written Opinion Issued in PCT Application No. PCT/US22/022978", dated Jul. 15, 2022, 13 Pages.

\* cited by examiner

```
200 ─┐
```

RECEIVE A CURRENT PRESSURE VALUE QUANTIFYING A PRESSURE MEASURED AT STYLUS TIP
<u>202</u>

RECEIVE A PROXIMITY INDICATOR THAT INDICATES A CURRENT ESTIMATED PROXIMITY OF STYLUS TIP TO DISPLAY SURFACE
<u>204</u>

BASED ON PROXIMITY INDICATOR, AND COMPARISON BETWEEN CURRENT PRESSURE VALUE AND TOUCH INPUT PRESSURE THRESHOLD, SEND TOUCH STATUS INDICATOR
<u>206</u>

FIG. 2

TOUCH STATUS INDICATION FOR ACTIVE STYLUS

BACKGROUND

Computing devices equipped with touch-sensitive displays may be configured to respond to inputs provided by a separate active stylus. In some cases, the computing device may respond differently depending on a proximity of the active stylus to the surface of the display. For example, the computing device may respond differently depending on whether the stylus is touching the surface of the display, or hovering over the display.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

An active stylus includes a stylus tip and a pressure sensor disposed proximate to the stylus tip. A stylus controller is configured to receive, from the pressure sensor, a current pressure value quantifying a pressure measured at the stylus tip. The stylus controller receives, from a separate display device, a proximity indicator that indicates a current estimated proximity of the stylus tip to a surface of a touch-sensitive display of the display device. Based at least on (1) the proximity indicator received from the separate display device, and (2) a comparison between the current pressure value and a touch input pressure threshold, the stylus controller sends a touch status indicator to the separate display device.

BRIEF DESCRIPTION OF THE DRAWINGS

FIG. 2 illustrates an example method for reporting a touch input status indicator.

DETAILED DESCRIPTION

Figure 1A:
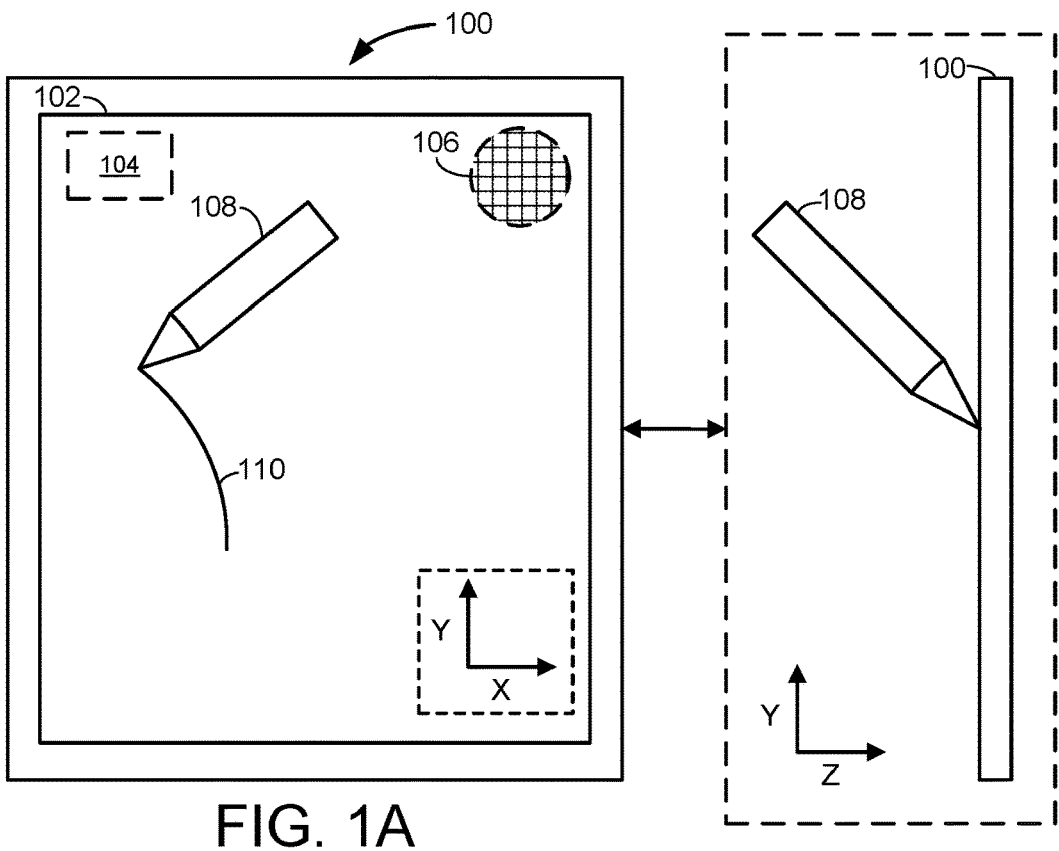
FIGS. 1A and 1B schematically depict an active stylus interacting with a touch-sensitive display device.

A computing device equipped with a touch-sensitive display may receive inputs from an active stylus, and may further respond differently to such inputs depending on a current proximity of the active stylus to the surface of the display. For example, the display device may exhibit one set of behaviors when the active stylus is contacting the surface of the display (e.g., rendering graphical "ink" in response to stylus movement across the display surface), and a different set of behaviors when the active stylus is hovering above the surface of the display (e.g., causing selection of graphical content displayed on the surface proximate to the stylus position).

As used herein, a stylus is "hovering" over the surface of the display when a tip of the stylus is close enough to the surface of the display that its presence is detectable by the display, while not physically contacting the display surface. The maximum range at which stylus tip proximity may be detected as a hover input may vary from implementation to implementation.

When the stylus transitions from touching the display to hovering, or vice versa, it is generally desirable for the display device to change its behavior relatively quickly. In other words, during a transition from hover to touch, it is typically desirable to minimize the amount of time from when touch first occurs to when the display switches from hover-mode behavior to touch-mode behavior. Similarly, when transitioning from touch to hover, it is typically desirable to minimize the amount of time from when the stylus first hovers (e.g., is lifted out of display surface contact by the user) to when the display switches from touch-mode behavior to hover-mode behavior.

To this end, an active stylus may in some cases include a pressure sensor configured to measure a pressure experienced at the stylus tip—e.g., caused by contact between the stylus tip and the display surface. Based on a current measurement output by the pressure sensor, the stylus may attempt to determine its current touch status with respect to the display surface (e.g., touching vs hovering), and report such information to the display device. However, measurements received from a pressure sensor may be influenced by electrical and/or mechanical noise, which can render such measurements unreliable. Such problems may be exacerbated over time as mechanical structures within the pressure sensor are worn through repeated use.

As examples, inconsistent pressure sensor performance can take the form of a high activation force (e.g., an excessively high pressure must be applied before the stylus contact is registered as a touch input), a delayed response to force or force release (e.g., there is a noticeable delay between touching the display surface, or removing the stylus from the display surface, before the display device responds appropriately), and non-repetition errors (e.g., the same stylus force may result in different pressure readings, and therefore different behaviors, at different times). Inconsistent or unreliable measurements at the pressure sensor can contribute to inconsistent behaviors from a display device in response to stylus inputs—e.g., the display device may exhibit touch behaviors when the stylus is hovering, or vice versa.

Even in cases where the pressure sensor is performing accurately, relying solely on the current pressure value to determine the current stylus touch status can give inaccurate results. For example, the stylus tip may be contacting the display surface at an angle that results in little of the pressure being applied to the pressure sensor—e.g., while the user is using the stylus to add shading to a drawing. In such cases, though the pressure sensor may accurately report the amount of pressure applied along its axis (e.g., a longitudinal axis of the stylus), such pressure may be insufficient to cause the stylus input to be recognized as a "touch" input, even though the stylus is touching the surface of the display.

Accordingly, the present disclosure is directed to techniques for determining and reporting the current touch status of an active stylus with respect to the surface of a touch-sensitive display. Specifically, the current touch status of the active stylus may be determined based on both a pressure measurement from a pressure sensor of the active stylus, as well as a proximity indicator received from a separate display device. Based at least on consideration of these factors, the active stylus may determine whether it is currently touching or hovering with respect to a display surface, and report such information to the display device. In this manner, the display device may more consistently and accurately respond to a user's intended stylus inputs, while mitigating the effects of inconsistent pressure sensor performance.

FIG. 1A schematically shows an example display device 100, including a touch-sensitive display 102. Both the touch-sensitive display 102 and display device 100 may have any suitable sizes and dimensions. In some examples, a display device may include more than one touch-sensitive display. For example, a display device as described herein may refer to a computing device having two or more touch-sensitive displays in a foldable or static configuration, as well as single-display devices such as display device 100. As non-limiting examples, computing devices can include desktop computers, laptops, smartphones, tablets, mixed reality devices, fitness devices (e.g., smartwatches), media center devices, automotive computing devices, and/or any other suitable computing devices communicatively coupled with an integrated or external touch-sensitive display. In some cases, a "computing device" as described herein may be implemented as computing system 400 described below with respect to FIG. 4.

Figure 1B:
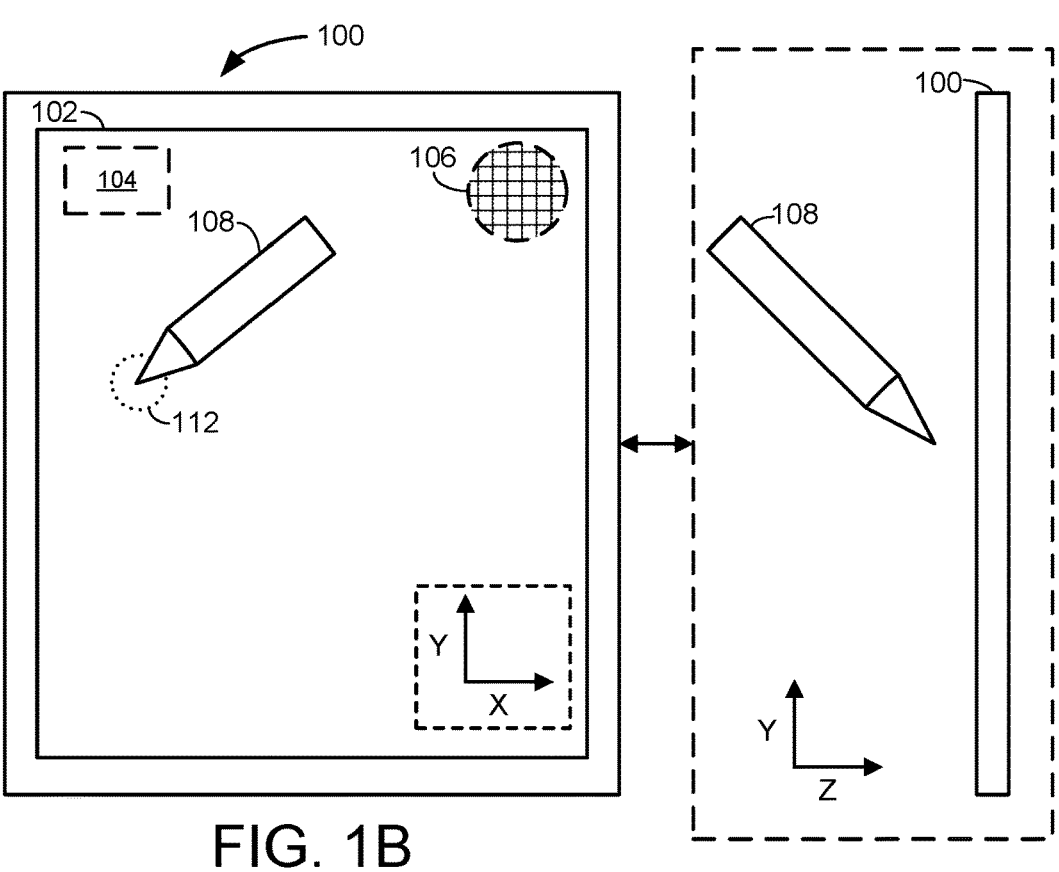

It will be understood that the devices and components depicted in FIGS. 1A and 1B, as well as the other FIGS. described herein, are simplified and schematic in nature. In practical examples, computing devices and active styluses may include additional or alternative components to those described herein, may have any suitable shapes, sizes, and form factors, and may have any suitable capabilities.

Display device 100 includes a controller 104 configured to perform one or more of the computing functions described herein. For example, as will be described in more detail below, controller 104 may be configured to transmit a proximity indicator to an active stylus, indicating an estimated current proximity of the stylus to the display surface. In some examples, the controller may include one or more computer processors, or other suitable logic hardware, working in tandem with one or more volatile or non-volatile data storage devices, or other suitable storage hardware. In some examples, controller 104 may be implemented via logic subsystem 402 and storage subsystem 404 described below with respect to FIG. 4.

Touch-sensitive display 102 includes a plurality of display electrodes, including electrodes 106, which may be configured to detect proximity of input objects to the touch-sensitive display. Input objects may include, as examples, human fingers, passive styluses, active styluses, and other suitable electronic devices or non-electronic objects. For example, the display electrodes may detect a change in capacitance caused by proximity of an input object to the display surface. By monitoring electrical conditions at the plurality of display electrodes, controller 104 may determine the two-dimensional position of the touch input relative to the surface of the display. Furthermore, the magnitude of the change in capacitance, as well as the number of display electrodes that are affected, may be used to infer the current proximity of an input object (e.g., taking the form of an active stylus) to the display surface. Display electrodes 106 and controller 104 are shown with dashed lines to indicate that they are disposed beneath the display surface and would not ordinarily be visible from the illustrated perspective.

In FIG. 1A, an active stylus 108 is contacting the surface of touch-sensitive display 102. Based at least in part on the contact between the stylus and the display, the display device is rendering visual content 110, taking the form of a line that reflects movement of the electronic device relative to the surface of the display over a particular window of time. In other words, in FIG. 1A, active stylus 108 is currently providing touch input to the display, insofar as the active stylus is making direct contact with the display surface (rather than hovering above the display surface, for example).

FIG. 1A also includes a side view that further illustrates the contact between a tip of active stylus 108 and a surface of a touch-sensitive display of display device 100. Thus, as described above, the display device may respond in a manner consistent with direct contact between the active stylus and the touch-sensitive display.

FIG. 1B again shows display device 100, including touch-sensitive display 102, controller 104, and display electrodes 106. In this example, however, active stylus 108 is no longer directly contacting the surface of the touch-sensitive display. Rather, the active stylus is hovering over the display surface. In this manner, a tip of the stylus is proximate to, and detectable by, the touch-sensitive display, but is not making physical contact with the display surface.

As with FIG. 1A, FIG. 1B also includes a side view that further illustrates the spatial relationship between the active stylus and the display device, showing how the active stylus is spaced away from the display surface. Thus, the display device may respond to the active stylus in a manner consistent with hover input (e.g., as opposed to touch input). In the example of FIG. 1B, display device 100 is rendering different visual content 112, which may, for example, indicate to the user that hovering of the active stylus has been detected at the touch-sensitive display.

As discussed above, a display device may beneficially respond quickly and accurately when an active stylus transitions from one touch state (e.g., touching) to another (e.g., hovering), or vice versa. To this end, FIG. 2 illustrates an example method 200 for determining a current stylus touch state, and reporting a touch input status indicator to a display device. Though method 200 is primarily described with respect to an active stylus, it will be understood that steps of method 200 may be implemented by any suitable computer processing componentry, having any suitable capabilities and form factors. As one non-limiting example, steps of method 200 may be performed by computing system 400 described below with respect to FIG. 4.

Figure 3:
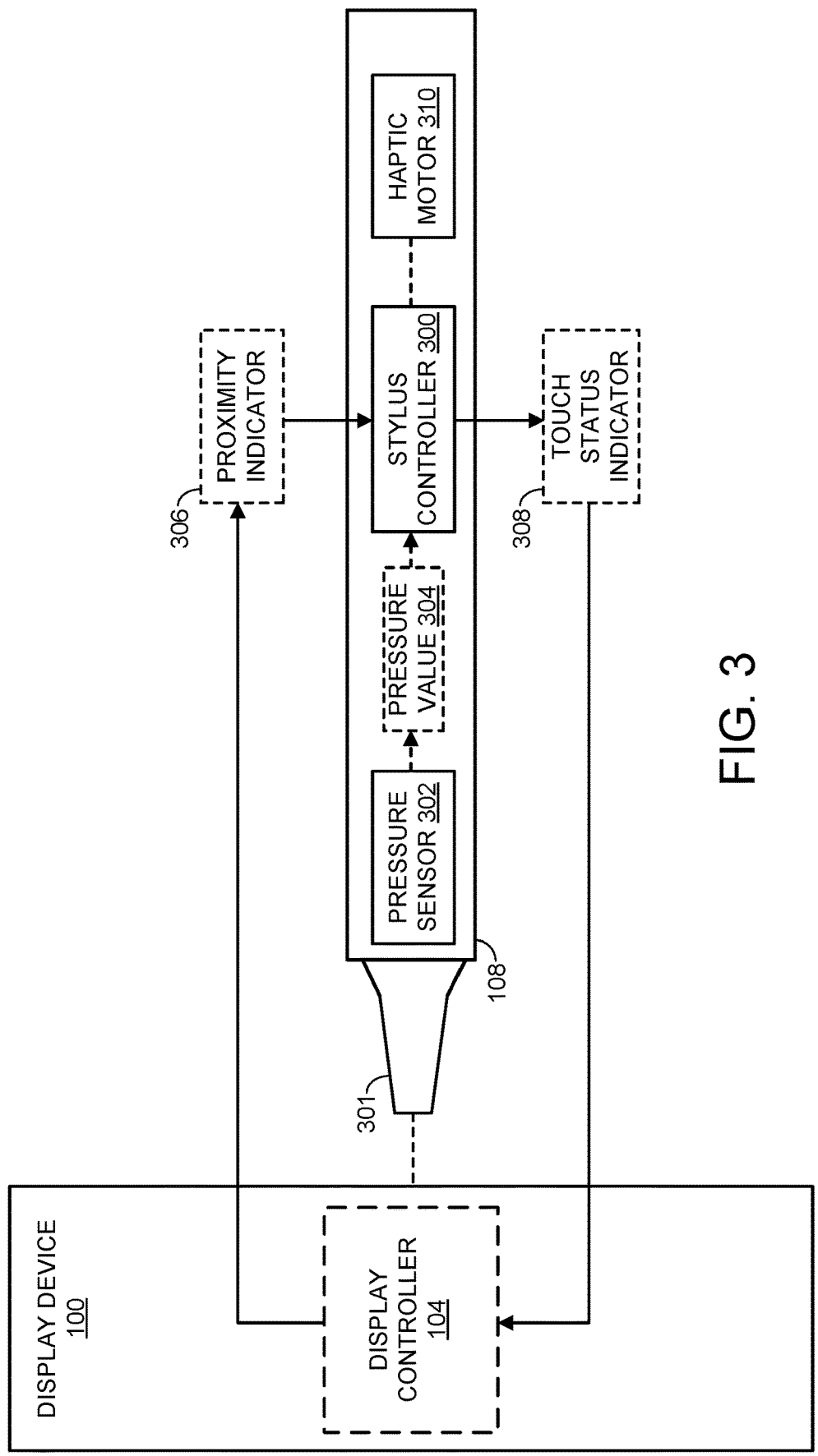
FIG. 3 schematically illustrates exchange of data between an active stylus and a touch-sensitive display device.

At 202, method 200 includes receiving a current pressure value quantifying a pressure measured at a stylus tip of an active stylus. This is schematically illustrated with respect to FIG. 3, showing active stylus 108 in more detail. As shown, active stylus 108 includes a stylus controller 300 that may be configured to perform one or more of the computing steps described herein. For example, stylus controller may be configured to perform one or more steps of method 200. As with controller 104, controller 300 may take the form of any suitable computer logic componentry, working in tandem with any suitable data storage componentry. As one example, controller 300 may be implemented via logic subsystem 402 and storage subsystem 404 described below with respect to FIG. 4.

Active stylus 108 also includes a stylus tip 301, and a pressure sensor 302 disposed proximate to the stylus tip. In the example of FIG. 3, stylus tip 301 has a tapered, pointed appearance that differs from an opposite end of the active stylus. It will be understood, however, that a "stylus tip" may have any suitable shape and appearance, including flat shapes, rounded shapes, or pointed shapes, etc., as non-limiting examples. Furthermore, in general, an "active stylus" may include two ends having similar or different shapes and appearances, and such ends may differ from either or both of the ends of active stylus 108 as depicted in FIG. 3.

Stylus controller 300 is configured to receive, from the pressure sensor, a current pressure value 304 quantifying a pressure measured at the stylus tip. Pressure sensor 302 may be configured to measure the current pressure value in any suitable way, using any suitable pressure-sensing technology. In one example, the pressure sensor may be an electromechanical pressure sensor that is affected by force applied to the stylus tip—for example, force applied along a longitudinal axis of the stylus body. It will be understood, however, that the techniques described herein are not limited to any particular pressure sensing technologies, or pressure sensor arrangements relative to other components of an active stylus. Rather, an active stylus as described herein may use any suitable pressure sensor, provided that it is capable of quantifying and reporting a pressure experienced at the stylus tip.

As such, current pressure value 304 may take any suitable form. For example, the current pressure value may be reported with any suitable degree of precision and using any suitable units and range of values. As one non-limiting example, the current pressure value may be reported in grams, and range in values from zero grams to several kilograms, depending on the amount of pressure measured at the stylus tip. As another example, the current pressure value may be reported as a value (e.g., an 8-bit value) that need not be converted into any particular unit measurement system.

Furthermore, the current pressure value may be measured with any suitable frequency. As non-limiting examples, the pressure experienced at the stylus tip may be measured 60 times per second or 120 times per second.

Returning briefly to FIG. 2, at 204, method 200 includes receiving, from a separate display device, a proximity indicator that indicates a current estimated proximity of the stylus tip to a surface of a touch-sensitive display of the display device. This is also illustrated in FIG. 3, in which active stylus 108 receives a current proximity indicator 306 from display controller 104 of display device 100.

The current proximity of the stylus tip to the surface of the touch-sensitive display may be estimated or calculated in any suitable way. As described above, the touch-sensitive display device may include a plurality of touch-sensitive display electrodes that are configured to detect a change in capacitance caused by proximity of a nearby input object, such as an active stylus. Such a change in capacitance may in some cases be influenced by electrical signals applied to a stylus electrode of the active stylus. Thus, in one example, the display device may estimate the current proximity of the active stylus to the display surface based at least on a magnitude of the change in capacitance observed at one or more display electrodes, and/or a number and distribution of display electrodes detecting a change in capacitance.

In general, when the active stylus is relatively closer to the surface of the display, the change in capacitance at each display electrode may have a relatively greater magnitude, and be relatively more localized to a particular set of display electrodes in close proximity to the stylus. By contrast, when the active stylus is relatively further from the display surface, the change in capacitance observed at the display electrodes may have a relatively smaller magnitude, and may be less localized to one particular region of the display. Thus, any time the display device detects a change in capacitance consistent with proximity of an active stylus, the display device may evaluate the intensity and distribution of the capacitance change to estimate the proximity of the active stylus to the display surface. As one example, a capacitance change having a relatively high magnitude may be determined to correspond to contact between the stylus tip and display surface (e.g., a touch input), while a capacitance change with a smaller magnitude may correspond to a small amount of separation between the stylus tip and display surface (e.g., a hover input).

Furthermore, the change in capacitance detected at the display electrodes may in some cases be associated with an electrostatic signal emitted by the stylus that has a certain frequency, or other known detectable properties. This may help the display device to distinguish a change in capacitance associated with the active stylus from a change in capacitance caused, for example, by proximity of a user hand, or other input object.

In some cases, the accuracy of a proximity estimation may be improved through use of a suitable calibration process. For example, a manufacturer and/or owner of the display device may perform a calibration routine in which an active stylus is placed at different known distances away from the display surface, and the resulting change in capacitance at the display device's display electrodes may be observed. During later use of the display device, stylus-associated changes in capacitance may be compared to these benchmark calibration capacitance measurements to infer the approximate distance of the stylus away from the surface of the display.

In other examples, however, the current proximity of the active stylus to the display surface may be determined in other suitable ways, relying on any suitable hardware of the active stylus and/or display device. As non-limiting examples, the display device may include one or more optical sensors configured to detect the active stylus in images captured by the display device, or include one or more acoustic sensors configured to detect an acoustic signal (e.g., an ultrasonic sound) emitted by the active stylus, and estimate the proximity of the active stylus based on such detections.

The proximity indicator received by the stylus controller from the display device may take any suitable form. For instance, the proximity indicator may include two or more different possible states, reflecting different possible spatial arrangements of the active stylus with respect to the display surface. As non-limiting examples, such possible states may include a stylus contact state (e.g., indicating that the stylus is contacting the display surface), and a stylus hover state (e.g., indicating that the stylus is hovering over the display).

In some examples, the proximity indicator may have multiple different possible hover states corresponding to different proximity ranges above the surface of the display. Thus, the proximity indicator may have three or more possible states. For example, a stylus low hover state may be used when the stylus is estimated to be hovering in relatively close proximity above the display surface, and/or a stylus high hover state may be used to indicate that the stylus is estimated to be hovering above the surface of the display with relatively less proximity. In cases where multiple different hover states are used, such different hover states may have any suitable granularity and proximity ranges. As one non-limiting example, the stylus low hover state may be used when the stylus has an estimated proximity of less than five millimeters away from the display surface, and the stylus high hover state may be used for an estimated proximity of greater than five millimeters. Furthermore, in cases where the proximity indicator has multiple possible states, one or more states may in some cases include a numerical value that expresses the estimated distance between the stylus tip and the display surface.

In some examples, the proximity indicator may include a confidence value. In an example scenario, the proximity indicator may have a stylus contact state along with a 70% confidence value, indicating that the display device has 70% confidence that the stylus is currently contacting the display surface. Alternatively, the relative confidence of a stylus's current estimated proximity may be reported by using different possible states of the proximity indicator. In other words, rather than using a stylus contact state with a confidence value, the display device may report the proximity indicator with a separate "likely stylus contact" state.

Use of multiple different possible hover states for the proximity indicator may beneficially enable more accurate determination of the current touch status of the active stylus. For example, upon determining that the estimated proximity of the active stylus to the display surface is decreasing (e.g., from a high hover state to a low hover state), the active stylus may predict a future moment at which contact will occur with the display surface, which may enable the active stylus to more quickly and accurately transition from a hover state to a touch state.

Furthermore, as will be described below in more detail, the active stylus may in some cases be configured to update a touch input pressure threshold based on a disagreement between the current pressure threshold and proximity indicator. In some cases, the active stylus may selectively update this threshold only when the proximity indicator has certain states—e.g., the pressure threshold may be updated when the proximity indicator has a high hover state, as this may indicate that the stylus is relatively unlikely to contact the display surface in the immediate future. By contrast, the stylus may refrain from updating the pressure threshold when the proximity indicator has a low hover state, as this may indicate that contact between the display surface and stylus tip is imminent.

As another example, the current proximity indicator may have a "disabled" state, indicating that the display device does not support estimating the proximity of the active stylus. This may be due to hardware limitations of the display device, or be a temporary condition caused by a current software or hardware configuration of the display device. In such cases, determination of the touch status of the stylus may be done based on the current pressure value, without considering an estimated proximity reported by the display device.

Additionally, or alternatively, the active stylus may not receive a current proximity indicator from the display device. Thus, as discussed above, if a proximity indicator is received that indicates a current estimated proximity of the stylus tip to a surface of a touch-sensitive display of the separate display device, the touch status indicator may have a first status value based at least on (a) the proximity indicator and (b) a comparison between the current pressure value and a touch input pressure threshold. By contrast, if a proximity indicator is not received that indicates a current estimated proximity of the stylus tip to a surface of a touch-sensitive display of the separate display device, the touch status indicator may have a second status value that does not account for an estimate of proximity between the stylus tip and the surface of the touch-sensitive display. Rather, the second status value may be based on the touch status indicated by the current pressure value reported by the pressure sensor, without regard to a proximity indicator received from the display device. This may occur when, for example, the current proximity indicator has a "disabled" state, or when no proximity indicator is received at all.

In some examples, a current proximity indicator may be received from the display device at some-times and not others. Additionally, or alternatively, the current proximity indicator may have a "disabled" state at some-times and not others. Thus, the stylus controller may be configured to selectively enable and disable, in connection with the touch status indicator, whether the touch status indicator accounts for proximity of the stylus tip to a surface of a touch-sensitive display of the separate display device. For example, when a current proximity indicator is received that does not have a "disabled" state, the stylus controller may enable accounting for such proximity in setting the touch status indicator. By contrast, when either no current proximity indicator is received, or a proximity indicator is received with a "disabled" state, the stylus controller may disable accounting for such proximity when setting the touch status indicator.

Furthermore, it will be understood that the proximity indicator may take other suitable forms from those described above. For example, the proximity indicator may express the estimated proximity of the active stylus to the display surface by quantifying the estimated proximity as a distance value—e.g., such as three millimeters.

The proximity indicator may be generated and sent to the stylus controller with any suitable frequency. In some examples, the display electrodes of the display device may detect touch events on each of a plurality of sequential touch sensing frames having a suitable frame rate, such as 60 frames-per-second (FPS). The display device and active stylus may in some cases exchange timing information to synchronize activity of the two devices and thereby achieve a shared sense of time. For example, each of the display device and active stylus may be configured to reserve portions of each touch sensing frame for exchange of data between the devices—e.g., via electrostatic excitation of display and/or stylus electrodes. Thus, in one example, the proximity indicator may be received at the stylus controller at least one time during each touch sensing frame of the plurality of touch sensing frames. Updating the proximity indicator one or more times per frame may beneficially allow the display device to transition between touch behaviors and hover behaviors with little to no latency observed by the user, without consuming undue transmission bandwidth between the display device and stylus. It will be understood that, in other examples, other suitable update frequencies may be used.

The proximity indicator may be received at the active stylus from the display device using any suitable communication method. In some cases, the proximity indicator may be received electrostatically—e.g., via an electrostatic communications channel. As discussed above, the computing device may in some cases include a touch-sensitive display that in turn includes a plurality of display electrodes. Similarly, the active stylus may include one or more stylus electrodes. The display electrodes may be driven with different signals, thereby producing an electrostatic effect that is detectable at the stylus electrode(s) of the active stylus. In some cases, the signals supplied to the display electrodes may be modulated in such a manner as to encode the proximity indicator. Thus, when the electrostatic signals are detected at the active stylus, the proximity indicator may be decoded and interpreted.

In other examples, however, the proximity indicator may be received in additional or alternative suitable ways. For example, the proximity indicator may be received via a suitable wireless communications interface of the display device—e.g., a Bluetooth interface or other suitable radio frequency (RF) communications channel.

Returning to FIG. 2, at 206, method 200 includes, based at least on the proximity indicator received from the separate display device, and a comparison between the current pressure value and a touch input pressure threshold, sending a touch status indicator to the separate display device. Specifically, the touch status indicator reflects a determination made by the active stylus as to whether the stylus tip is currently contacting the surface of the touch-sensitive display. Such a determination is made at least by considering both the pressure value received from the pressure sensor, as well as the proximity indicator received by the display device.

This is also schematically illustrated with respect to FIG. 3. As shown, after receiving current pressure value 304, and proximity indicator 306, stylus controller 300 generates a touch status indicator 308, which is transmitted to display controller 104 of display device 100. Based on the state of the touch status indicator (e.g., a touch state vs a hover state), the display device may respond differently to a detected proximity of the stylus to the display surface.

In some cases, determining the touch status indicator may include comparing the current pressure value received from the pressure sensor to a preexisting touch input pressure threshold maintained by the active stylus. If the current pressure value is less than the touch input pressure threshold, that may be an indication that the stylus tip is not experiencing as much pressure as would be expected if the stylus is touching the surface of the display. By contrast, if the current pressure value is higher than the touch input pressure threshold, that may be an indication that the stylus tip is touching the display surface.

The touch input pressure threshold may have any suitable value. As discussed above, the pressure sensor may in some cases be affected by electrical and/or mechanical noise. Thus, even in cases where the stylus tip is not currently experiencing any pressure, the pressure sensor may nonetheless report a current pressure value of greater than zero. It may therefore be desirable for the touch input pressure threshold to have a value of greater than zero, to reduce the occurrence of false positives associated with electrical and/or mechanical noise causing the current pressure value to exceed the touch input pressure threshold.

However, even when a non-zero touch input pressure threshold is used, electrical and/or mechanical noise can still cause the active stylus to report inaccurate touch input status indicators when only the current pressure value is considered. This may be exacerbated by degradation or wear of internal components of the pressure sensor caused by repeated use over time. Thus, as described above, the active stylus may in some cases determine the touch status indicator based at least on both a comparison between the current pressure value and the touch input pressure threshold, and the current proximity indicator received by the display device.

Using both the pressure value comparison, as well as the current proximity indicator, may beneficially improve the accuracy with which the stylus touch state is detected. For example, the current proximity indicator may be relatively less susceptible to electrical and mechanical noise as compared to the pressure sensor disposed within the active stylus, and may therefore serve as a more accurate indication of the current touch status of the active stylus in certain scenarios. However, the current proximity indicator may provide relatively less granular information than the current pressure value, as it typically does not reflect the amount of force with which the stylus is contacting the display surface. The pressure sensor, by contrast, can quantify whether the stylus tip is lightly contacting the display surface, or is forcibly pressed against the display surface, which can impact how the display device responds to touch input, as well as improve the confidence with which the stylus touch status is determined. Furthermore, the pressure sensor may be relatively more responsive to rapid changes in stylus touch status, as compared to the proximity indicator.

In cases where the pressure value and proximity indicator agree as to the current touch status of the active stylus, the touch status indicator may reflect this agreement. In other words, the touch status indicator may have a "touch" state indicating that the stylus tip is touching the surface of the touch-sensitive display based at least on the current pressure value exceeding the touch input pressure threshold, and further based on the proximity indicator indicating that the stylus tip is touching the surface of the touch-sensitive display. By contrast, the touch status indicator may have a "hover" state indicating that the stylus tip is hovering over the surface of the touch-sensitive display device based at least on the current pressure value being less than the touch input pressure threshold, and further based on the proximity indicator indicating that the stylus tip is spaced away from the surface of the touch-sensitive display.

In some scenarios, the touch status indicated by the current proximity indicator may differ from the touch status indicated by comparing the current pressure value to the touch input pressure threshold. In such cases, the active stylus may defer to the current proximity indicator, rather than the current pressure value, as the pressure value may be relatively more likely to be affected by electrical and/or mechanical noise. In other words, based on the stylus controller determining that the current pressure value exceeds the touch input pressure threshold, and the proximity indicator indicating that the stylus tip is spaced away from the surface of the touch-sensitive display, the touch status indicator may have a "hover" state indicating that the stylus tip is hovering over the surface of the touch-sensitive display device. Similarly, based on the stylus controller determining that the current pressure value is less than the touch input pressure threshold, and the proximity indicator indicating that the stylus tip is touching the surface of the touch-sensitive display, the touch status indicator may have a "touch" state indicating that the stylus tip is touching the surface of the touch-sensitive display.

In other examples, however, the active stylus need not always defer to the proximity indicator when a disagreement occurs between the proximity indicator and current pressure value. Rather, in some examples, different weightings may be applied to the comparison between the pressure value and pressure threshold, and to the proximity indicator received from the display device, and the touch status of the active stylus may be determined based on a weighted consideration of at least these two factors. For example, when the current pressure value is significantly higher than the touch input pressure threshold, and the proximity indicator has a relatively low confidence value (or indicates that the stylus has a low hover state), the pressure value may be assigned a higher weighting than the proximity indicator. Thus, in this example, the touch status indicator may have a touch state indicating that the stylus tip is touching the surface of the display.

In some examples, the accuracy of determining the current touch state of an active stylus may be improved by using a suitable learning algorithm over time (e.g., via suitable machine learning or artificial intelligence techniques). For example, when information regarding the ground truth touch state of the active stylus is available (e.g., via user feedback and/or other suitable sensors disposed in the stylus/display), a suitable learning algorithm may dynamically assign different weights to the current pressure value and to the proximity indicator reported by the display device, and thereby gradually determine which readings tend to be more accurate and consistent under different conditions. Non-limiting examples of suitable machine learning and/or artificial intelligence techniques are given below with respect to FIG. 4.

Based on disagreement between the touch status indicated by the current proximity indicator, and the touch status indicated by the current pressure value, the active stylus may determine that the touch input pressure threshold should be updated—e.g., to reduce the chances of such disagreement in the future. For instance, when the touch status indicator is reported with a hover state based on the current proximity indicator, despite the current pressure value exceeding the touch input pressure threshold, the stylus controller may update the touch input pressure threshold to be higher than the current pressure value. Thus, in the future, the current pressure value would indicate that the stylus tip is hovering over, rather than touching, the display surface. Similarly, when the touch status indicator is reported with a hover state based on the current proximity indicator, despite the current pressure value being less than the touch input pressure threshold, the stylus controller may update the touch input pressure threshold to be less than the current pressure value. Thus, in the future, the current pressure value would indicate that the stylus tip is touching, rather than hovering over, the display surface.

Additionally, or alternatively, updating the touch input pressure threshold need not include changing a digital pressure value. Rather, in some examples, the touch input pressure threshold may be changed by altering a hardware gain of the pressure sensor—e.g., such that a given pressure applied to the stylus tip causes a greater or lower pressure value to be reported by the pressure sensor. Similarly, the stylus controller may be configured to change mechanical properties of the pressure sensor—e.g., by increasing or decreasing a mechanical resistance to pressure caused by physical elements within the pressure sensor—and thereby change how the pressure sensor responds to pressure applied to the stylus tip. This may generally be done any time there is a disagreement between the touch status indicated by the current proximity indicator and the touch status indicated by the current pressure value, to improve the consistency of these two indicators going forward.

The present disclosure has thus far focused on a single "touch input pressure threshold" used to infer the current touch status of the stylus. In some cases, the touch input pressure threshold may be specific to one type of touch status transition—e.g., from hovering to touching—and the stylus controller may maintain one or more additional thresholds for other transitions. For instance, the touch input pressure threshold may be used for determining when the touch status indicator should be switched from a hover state to a touch state, and the stylus controller may further maintain a hover input pressure threshold used for determining when the touch status indicator should be switched from the touch state to the hover state. Notably, the hover input pressure threshold may have a different value from the touch input pressure threshold. As one non-limiting example, the touch input pressure threshold may have a value of 20 g, while the hover input pressure threshold has a value of 60 g, although other suitable values may be used.

As with the current proximity indicator, the touch status indicator may be transmitted in any suitable way. For example, the touch status indicator may be encoded as an electrostatic signal applied to a stylus electrode of the active stylus. The electrostatic signal may then be detected at display electrodes of the display device, where it may be decoded and interpreted. As another non-limiting example, the touch status indicator may be transmitted via a suitable RF communication channel supported by the active stylus and display device, such as Bluetooth.

The touch status indicator may further be transmitted with any suitable frequency. As one example, the touch status indicator may be sent to the display device four times during each touch sensing frame of a plurality of touch sensing frames. Updating the touch status indicator four times per frame may beneficially allow the display device to transition between touch behaviors and hover behaviors with little to no latency observed by the user, without consuming undue transmission bandwidth between the display device and stylus. It will be understood that, in other examples, other suitable update frequencies may be used. For example, the touch status indicator may be transmitted once per frame, using a relatively shorter communications window during each frame.

In some examples, the current pressure value measured at the pressure sensor may additionally be transmitted to the display device. The display device may, for example, change how it responds to touch inputs based on the force with which such force inputs are applied, as indicated by the current pressure value. The pressure value may be transmitted in any suitable way—e.g., electrostatically or via an RF channel. Furthermore, the pressure value may be transmitted with any suitable frequency. As one example, the pressure value may be transmitted once per touch-sensing frame.

The display device and/or active stylus may exhibit any suitable behaviors based on the current state of the touch status indicator. As discussed above, the display device may exhibit one set of behaviors for touch input, and another set of behaviors for touch input. For example, when the stylus tip is determined to be touching the display surface, the display device may in one example render graphical "ink" input that reflects movements of the stylus across the surface of the display, such as graphical content 110 in FIG. 1A. When the stylus tip is determined to be hovering over the display surface, the display device may respond in another suitable way—e.g., by rendering an indicator (such as graphical content 112 shown in FIG. 1B) that enables the user to select or highlight graphical content presented on the display.

In some examples, the behavior of the active stylus may additionally or alternatively be changed based on the current state of the touch status indicator. For example, when the touch status indicator has a touch state indicating that the stylus tip is touching the surface of the touch-sensitive display, the stylus controller may be configured to provide haptic feedback to a user of the active stylus. For example, the active stylus may attempt to mimic the tactile sensation of writing on paper using a pencil. This may be achieved via a suitable haptic motor integrated within the active stylus, such as haptic motor 310 shown in FIG. 3. The haptic motor may use any suitable mechanism for providing haptic feedback. In one example, the haptic motor may be a linear resonant actuator.

As another example, when the touch status indicator has a hover state indicating that the stylus tip is hovering over the surface of the touch sensitive display, one or more internal components of the active stylus may be disabled to save power. For example, while hovering, the stylus controller may selectively disable the pressure sensor and/or haptic motor, until such time as the current proximity indicator indicates that the active stylus may be approaching or touching the display surface.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 4:
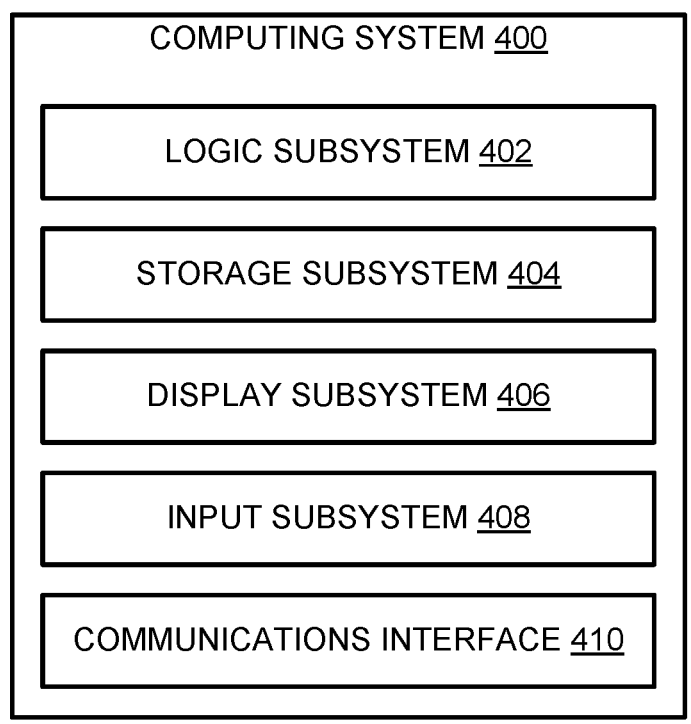
FIG. 4 schematically shows an example computing system.

FIG. 4 schematically shows a simplified representation of a computing system 400 configured to provide any to all of the compute functionality described herein. Computing system 400 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 400 includes a logic subsystem 402 and a storage subsystem 404. Computing system 400 may optionally include a display subsystem 406, input subsystem 408, communication subsystem 410, and/or other subsystems not shown in FIG. 4.

Logic subsystem 402 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 404 includes one or more physical devices configured to temporarily and/or permanently hold computer information such as data and instructions executable by the logic subsystem. When the storage subsystem includes two or more devices, the devices may be collocated and/or remotely located. Storage subsystem 404 may include volatile, nonvolatile, dynamic, static, read/write, read-only, random-access, sequential-access, location-addressable, file-addressable, and/or content-addressable devices. Storage subsystem 404 may include removable and/or built-in devices. When the logic subsystem executes instructions, the state of storage subsystem 404 may be transformed—e.g., to hold different data.

Aspects of logic subsystem 402 and storage subsystem 404 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

Machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

When included, display subsystem 406 may be used to present a visual representation of data held by storage subsystem 404. This visual representation may take the form of a graphical user interface (GUI). Display subsystem 406 may include one or more display devices utilizing virtually any type of technology. In some implementations, display subsystem may include one or more virtual-, augmented-, or mixed reality displays.

When included, input subsystem 408 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 410 may be configured to communicatively couple computing system 400 with one or more other computing devices. Communication subsystem 410 may include wired and/or wireless communication devices compatible with one or more different communication protocols. The communication subsystem may be configured for communication via personal-, local- and/or wide-area networks.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, an active stylus comprises: a stylus tip; a pressure sensor disposed proximate to the stylus tip; and a stylus controller configured to: receive, from the pressure sensor, a current pressure value quantifying a pressure measured at the stylus tip; receive, from a separate display device, a proximity indicator that indicates a current estimated proximity of the stylus tip to a surface of a touch-sensitive display of the separate display device; and based at least on both of (1) the proximity indicator received from the separate display device and (2) a comparison between the current pressure value and a touch input pressure threshold, send a touch status indicator to the separate display device. In this example or any other example, the touch status indicator has a touch state indicating that the stylus tip is touching the surface of the touch-sensitive display based at least on the current pressure value exceeding the touch input pressure threshold, and further based at least on the proximity indicator indicating that the stylus tip is touching the surface of the touch-sensitive display. In this example or any other example, the touch status indicator has a hover state indicating that the stylus tip is hovering over the surface of the touch-sensitive display device based at least on the current pressure value being less than the touch input pressure threshold, and further based at least on the proximity indicator indicating that the stylus tip is spaced away from the surface of the touch-sensitive display. In this example or any other example, based at least on (1) the stylus controller determining that the current pressure value exceeds the touch input pressure threshold, and (2) the proximity indicator indicating that the stylus tip is spaced away from the surface of the touch-sensitive display, the touch status indicator is caused to have a hover state indicating that the stylus tip is hovering over the surface of the touch-sensitive display device. In this example or any other example, the stylus controller is further configured to update the touch input pressure threshold to be higher than the current pressure value. In this example or any other example, based at least on (1) the stylus controller determining that the current pressure value is less than the touch input pressure threshold, and (2) the proximity indicator indicating that the stylus tip is touching the surface of the touch-sensitive display, the touch status indicator is caused to have a touch state indicating that the stylus tip is touching the surface of the touch-sensitive display. In this example or any other example, the stylus controller is further configured to update the touch input pressure threshold to be less than the current pressure value. In this example or any other example, the proximity indicator has three or more possible states, including a stylus contact state, a stylus low hover state, and a stylus high hover state. In this example or any other example, the proximity indicator includes a confidence value. In this example or any other example, the touch input pressure threshold is used for determining when the touch status indicator should be switched from a hover state to a touch state, and the stylus controller further maintains a hover input pressure threshold used for determining when the touch status indicator should be switched from the touch state to the hover state, the hover input pressure threshold having a different value from the touch input pressure threshold. In this example or any other example, the stylus controller is further configured to provide haptic feedback to a user of the active stylus when the touch status indicator has a touch state indicating that the stylus tip is touching the surface of the touch-sensitive display. In this example or any other example, the proximity indicator is received from the separate display device at least one time during each touch sensing frame of a plurality of touch sensing frames.

In an example, a method for an active stylus comprises: receiving, from a pressure sensor disposed proximate to a stylus tip of the active stylus, a current pressure value quantifying a pressure measured at the stylus tip; receiving, from a separate display device, a proximity indicator that indicates a current estimated proximity of the stylus tip to a surface of a touch-sensitive display of the separate display device; and based at least on both of (1) the proximity indicator received from the separate display device, and (2) a comparison between the current pressure value and a touch input pressure threshold, sending a touch status indicator to the separate display device. In this example or any other example, based at least on (1) the current pressure value exceeding the touch input pressure threshold, and (2) the proximity indicator indicating that the stylus tip is spaced away from the surface of the touch-sensitive display, the touch status indicator is caused to have a hover state indicating that the stylus tip is hovering over the surface of the touch-sensitive display device. In this example or any other example, the method further comprises updating the touch input pressure threshold to be higher than the current pressure value. In this example or any other example, based at least on (1) the current pressure value being less than the touch input pressure threshold, and (2) the proximity indicator indicating that the stylus tip is touching the surface of the touch-sensitive display, the touch status indicator is caused to have a touch state indicating that the stylus tip is touching the surface of the touch-sensitive display. In this example or any other example, the method further comprises updating the touch input pressure threshold to be less than the current pressure value.

In an example, an active stylus comprises: a stylus tip; a pressure sensor disposed proximate to the stylus tip; and a stylus controller, configured to: receive, from the pressure sensor, a current pressure value quantifying a pressure measured at the stylus tip; send a touch status indicator to a separate display device; and (1) wherein, if a proximity indicator is received that indicates a current estimated proximity of the stylus tip to a surface of a touch-sensitive display of the separate display device, the touch status indicator has a first status value based at least on (a) the proximity indicator and (b) a comparison between the current pressure value and a touch input pressure threshold, and (2) wherein, if a proximity indicator is not received that indicates a current estimated proximity of the stylus tip to a surface of a touch-sensitive display of the separate display device, the touch status indicator has a second status value that does not account for an estimate of proximity between the stylus tip and the surface of the touch-sensitive display. In this example or any other example, the stylus controller is configured to selectively enable and disable, in connection with the touch status indicator, whether the touch status indicator accounts for proximity of the stylus tip to a surface of a touch-sensitive display of the separate display device. In this example or any other example, the proximity indicator is received via one or both of an electrostatic communications channel and a radio frequency (RF) communications channel.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An active stylus, comprising:
a stylus tip;
a pressure sensor disposed proximate to the stylus tip; and
a stylus controller, configured to:
receive, from the pressure sensor, a current pressure value quantifying a pressure measured at the stylus tip;
receive, from a separate display device that is physically separate from and external to the active stylus, a proximity indicator that indicates a current estimated proximity of the stylus tip to a surface of a touch-sensitive display of the separate display device,
wherein the proximity indicator is generated by the separate display device and transmitted from the separate display device to the active stylus based at least in part on a detected change in capacitance caused by proximity of the stylus tip to the separate display device; and
based at least on both of (1) the proximity indicator received from the separate display device and (2) a comparison between the current pressure value and a touch input pressure threshold, send a touch status indicator to the separate display device,
wherein the touch status indicator sent to the separate display device is at least partially dependent on the proximity indicator previously received from the separate display device, and wherein the touch input pressure threshold is a previously-defined pressure value greater than zero.

2. The active stylus of claim 1, wherein the touch status indicator has a touch state indicating that the stylus tip is touching the surface of the touch-sensitive display based at least on the current pressure value exceeding the touch input pressure threshold, and further based at least on the proximity indicator indicating that the stylus tip is touching the surface of the touch-sensitive display.

3. The active stylus of claim 1, wherein the touch status indicator has a hover state indicating that the stylus tip is hovering over the surface of the touch-sensitive display device based at least on the current pressure value being less than the touch input pressure threshold, and further based at least on the proximity indicator indicating that the stylus tip is spaced away from the surface of the touch-sensitive display.

4. The active stylus of claim 1, wherein, based at least on (1) the stylus controller determining that the current pressure value exceeds the touch input pressure threshold, and (2) the proximity indicator indicating that the stylus tip is spaced away from the surface of the touch-sensitive display, the touch status indicator is caused to have a hover state indicating that the stylus tip is hovering over the surface of the touch-sensitive display device.

5. The active stylus of claim 4, wherein the stylus controller is further configured to update the touch input pressure threshold to be higher than the current pressure value.

6. The active stylus of claim 1, wherein, based at least on (1) the stylus controller determining that the current pressure value is less than the touch input pressure threshold, and (2) the proximity indicator indicating that the stylus tip is touching the surface of the touch-sensitive display, the touch status indicator is caused to have a touch state indicating that the stylus tip is touching the surface of the touch-sensitive display.

7. The active stylus of claim 6, wherein the stylus controller is further configured to update the touch input pressure threshold to be less than the current pressure value.

8. The active stylus of claim 1, wherein the proximity indicator has three or more possible states, including a stylus contact state, a stylus low hover state, and a stylus high hover state.

9. The active stylus of claim 1, wherein the proximity indicator includes a confidence value.

10. The active stylus of claim 1, wherein the touch input pressure threshold is used for determining when the touch status indicator should be switched from a hover state to a touch state, and the stylus controller further maintains a hover input pressure threshold used for determining when the touch status indicator should be switched from the touch state to the hover state, the hover input pressure threshold having a different value from the touch input pressure threshold.

11. The active stylus of claim 1, wherein the stylus controller is further configured to provide haptic feedback to a user of the active stylus when the touch status indicator has a touch state indicating that the stylus tip is touching the surface of the touch-sensitive display.

12. The active stylus of claim 1, wherein the proximity indicator is received from the separate display device at least one time during each touch sensing frame of a plurality of touch sensing frames.

13. A method for an active stylus, the method comprising:
receiving, from a pressure sensor disposed proximate to a stylus tip of the active stylus, a current pressure value quantifying a pressure measured at the stylus tip;
receiving, from a separate display device that is physically separate from and external to the active stylus, a proximity indicator that indicates a current estimated proximity of the stylus tip to a surface of a touch-sensitive display of the separate display device,
wherein the proximity indicator is generated by the separate display device and transmitted from the separate display device to the active stylus based at least in part on a detected change in capacitance caused by proximity of the stylus tip to the separate display device; and
based at least on both of (1) the proximity indicator received from the separate display device, and (2) a comparison between the current pressure value and a touch input pressure threshold, sending a touch status indicator to the separate display device,
wherein the touch status indicator sent to the separate display device is at least partially dependent on the proximity indicator previously received from the separate display device, and wherein the touch input pressure threshold is a previously-defined pressure value greater than zero.

14. The method of claim 13, wherein, based at least on (1) the current pressure value exceeding the touch input pressure threshold, and (2) the proximity indicator indicating that the stylus tip is spaced away from the surface of the touch-sensitive display, the touch status indicator is caused to have a hover state indicating that the stylus tip is hovering over the surface of the touch-sensitive display device.

15. The method of claim 14, further comprising updating the touch input pressure threshold to be higher than the current pressure value.

16. The method of claim 13, wherein, based at least on (1) the current pressure value being less than the touch input pressure threshold, and (2) the proximity indicator indicating that the stylus tip is touching the surface of the touch-sensitive display, the touch status indicator is caused to have a touch state indicating that the stylus tip is touching the surface of the touch-sensitive display.

17. The method of claim 16, further comprising updating the touch input pressure threshold to be less than the current pressure value.

18. An active stylus, comprising:
a stylus tip;
a pressure sensor disposed proximate to the stylus tip; and
a stylus controller, configured to:
receive, from the pressure sensor, a current pressure value quantifying a pressure measured at the stylus tip;
send a touch status indicator to a separate display device that is physically separate from and external to the active stylus; and
wherein, if a proximity indicator is received from the separate display device that indicates a current estimated proximity of the stylus tip to a surface of a touch-sensitive display of the separate display device, the touch status indicator has a first status value based at least on (a) the proximity indicator and (b) a comparison between the current pressure value and a touch input pressure threshold, wherein the proximity indicator is generated by the separate display device based at least in part on a detected change in capacitance caused by proximity of the stylus tip to the separate display device, and wherein the touch input pressure threshold is a previously-defined pressure value greater than zero.

19. The active stylus of claim 18, wherein the stylus controller is configured to selectively enable and disable, in connection with the touch status indicator, whether the touch status indicator accounts for proximity of the stylus tip to a surface of a touch-sensitive display of the separate display device.

20. The active stylus of claim 18, wherein the proximity indicator is received via one or both of an electrostatic communications channel and a radio frequency (RF) communications channel.

* * * * *